United States Patent [19]

Nishikawa et al.

[11] Patent Number: 4,785,318

[45] Date of Patent: Nov. 15, 1988

[54] ELECTROSTATIC RECORDING HEAD

[75] Inventors: Masaji Nishikawa; Masashi Asano; Yutaka Adachi, all of Tokyo, Japan

[73] Assignee: Olympus Optical Co., Ltd., Tokyo, Japan

[21] Appl. No.: 71,205

[22] Filed: Jul. 8, 1987

[30] Foreign Application Priority Data

Jul. 14, 1986 [JP] Japan ................................ 61-165031

[51] Int. Cl.[4] ............................................ G01D 15/06

[52] U.S. Cl. ................................ 346/155; 346/139 C

[58] Field of Search .................. 346/155, 154, 139 C, 346/76 PH, 162–164, 150, 153.1; 400/119; 358/300

[56] References Cited

U.S. PATENT DOCUMENTS

| | | | |
|---|---|---|---|
| 4,030,107 | 6/1977 | Tagawa | 346/155 |
| 4,287,524 | 9/1981 | Ohnishi et al. | 346/155 |
| 4,553,150 | 11/1985 | Katahira | 346/154 |

FOREIGN PATENT DOCUMENTS

| | | | |
|---|---|---|---|
| 2050948 | 1/1981 | Japan | 346/155 |
| 1546289 | 5/1979 | United Kingdom | 346/155 |
| 2100196 | 12/1982 | United Kingdom | 346/155 |

*Primary Examiner*—Arthur G. Evans
*Attorney, Agent, or Firm*—Frishauf, Holtz, Goodman & Woodward

[57] ABSTRACT

An electrostatic recording head comprises a number of recording electrode styli arranged at spaces from one another, in a row, the electrode styli being divided along the row into sets each constituting an element region, each predetermined number of the element regions being put together along the row, thereby constituting groups, and a plurality of block electrodes arranged corresponding to the element regions. A wiring board includes a plurality of connectors with a plurality of wires for signal input, the connectors corresponding individually to the groups, each wire having a connecting terminal situated close to the recording electrode stylus of each corresponding group. Wires connect the connecting terminals and a plurality of specified recording electrode styli of the corresponding groups.

6 Claims, 7 Drawing Sheets

ELECTROSTATIC RECORDING HEAD

BACKGROUND OF THE INVENTION

The present invention relates to an electrostatic recording head in which a number of recording electrode styli are arranged in a row and divided into subgroups each including a plurality of styli, and block electrodes are arranged corresponding individually to the subgroups, the styli and the electrodes being combined to effect a matrix connection and drive.

Conventionally known is an electrostatic recording system using an electrostatic recording head. In the recording head, a number of recording electrode styli are arranged in one or more rows, and are divided into subgroups, each including a plurality of styli along a row direction. Block electrodes are arranged corresponding individually to the subgroups. Recording voltages are applied successively to the individual electrode styli and block electrodes of the recording head, thereby forming an electrostatic latent image on a recording medium. Then, the latent image is visualized for information recording.

FIG. 1 illustrates an electrostatic recording system called a flush control system. In FIG. 1, numeral 1 denotes an electrostatic recording head; 2, an electrostatic recording sheet; and 3, a pressure roller. Recording head 1 is constructed so that a plurality of sets or combinations of a number of recording electrode styli 4, arranged in a row, and paired block electrodes 5*a* and 5*b* are held insulated from one another by means of insulator 6.

Approximately half of the necessary voltage for each recording cycle is applied to recording electrode styli 4, and the other half is applied to block electrodes 5*a* and 5*b*. Recording is executed when the two half voltages are superposed.

FIG. 2 illustrates an electrostatic recording system called a double-sided control system. In FIG. 2, numeral 7 denotes an electrostatic recording head; 2, an electrostatic recording sheet; and 8, a back electrode, In recording head 7, a number of recording electrode styli 9 are held by means of insulator 10. Back electrode 8 is split into a plurality of sections, thus constituting a block electrode. Approximately half of the necessary voltage for each recording cycle is applied to electrode styli 9, and the other half is applied to the block electrode. A method of matrix recording using such a matrix recording head is disclosed in Japanese Patent Publication No. 36-4119, for example.

FIG. 3 shows an arrangement of a prior art matrix electrostatic recording head. In FIG. 3, symbol S designates recording electrode styli, and symbols X1, X2, . . . Xn desginate block electrodes. Symbols A1, B1, A2, and B2 designate element regions of a matrix arrangement including divided sets of electrode styli. Region A1 is situated halfway between block electrodes X1 and X2, extending over both of them. Likewise, region B1 is situated halfway between electrodes X2 and X3, extending over both these electrodes. Regions A1, A2, . . . include n electrode styli each. Corresponding electrode styli of the individual regions are coupled in common to one another, and are connected to their corresponding terminals 1, 2, 3, . . . n of terminal section A. Likewise, regions B1, B2, . . . include m electrode styli each, and corresponding styli of these individual regions are coupled in common to one another, and are connected to terminals 1, 2, 3, . . . m of terminal section B.

In recording, a recording signal voltage is applied to terminal section A or B, and those two block electrodes corresponding to the element region of the matrix to be recorded are selected and supplied with the voltage. In recording element region A4, for example, the voltage or recording signal is applied to block electrodes X7 and X8 and terminal section A. In recording element region B2, moreover, the recording signal is applied to electrodes X4 and X5 and terminal section B.

Usually, wiring board P is used for wiring for the selective supply of the recording signal to the recording electrode styli. A number of wire-bundle junctions C are arranged on the board. Junctions C are connected to connectors CN1 and CN2 by wiring on the board. Conventional driver circuits (not shown) are connected individually to connector pins 1, 2, 3, . . . n.

In the recording head adapted for the matrix drive, as described above, wires W are drawn out from various points, over the whole length of the head in the longitudinal direction thereof or in the arrangement direction of the styli, in order to connect a number of recording electrode styli in common to terminal sections A and B. If the recording head is as long as several tens of inches, and if the electrode styli connected to one of the termianl sections are as many as 100 to 200 in number, the stray capacity and wire-coupling capacity or parastic capacity of the wire bundles increase, thereby causing various troubles. In manufacturing an elongate recording head, these troubles are expressly noticeable.

More specifically, the amount of current necessary for recording increases, for example. Although the current required for the electrostatic recording itself is practically negligible, the driver circuit must be supplied with a large current to charge the stray capacity. Accordingly, driver elements with a large current capacity must be used for the driver circuit, and a high-voltage power source must have a large capacity. When applying a signal to terminal section A, moreover, terminal section B must not be supplied with any voltage. Nevertheless, voltage is supplied also to terminal section B through the wires. While one of the element regions is being recorded, therefore, wrong recording dots will possibly be formed on the adjacent element region.

In order to eliminate such troubles, an arrangement has conventionally been provided in which the stray capacity of the recording dots is reduced. FIG. 4 shows a recording head disclosed in Japanese Patent Publication No. 57-8469, as an example of such a conventional arrangement. In FIG. 4, symbols P1, P2, P3, . . . Pi designate electrode styli, which are arranged in two rows A and B. Symbols E1, E2, . . . En and F1, F2, . . . Fn designate wires; numerals 7 and 8, wiring boards; and symbols Q1, Q2 and Q3 and R1, R3, wiring-board conductor lines. The wires from one row of recording electrode styli are led alternately to the two different wiring boards, and are connected individually to their corresponding conductor lines. In this manner, at least two wiring boards are provided for each row of electrode styli, that is, at least four wiring boards are provided for two stylus rows A and B, and the wires are distributed in a three-dimensional space. Thus, the stray capacity is reduced.

Although the stray capacity can be reduced, in such an arrangement, junctions of wires on the wiring boards are increased in number, thus requiring enlargement of the wiring boards. Moreover, the number of wiring boards is increased, so that the space the boards occupy must also be increased. Accordingly, the manufacture of the recording head is further complicated.

SUMMARY OF THE INVENTION

Accordingly, the object of the present invention is to provide an electrostatic recording head adapted especially for an elongate design, in which the stray capacity of terminals to which recording signal voltages are applied is small, so that the driver circuit and power source can be reduced in capacity, and that recording dots can be prevented from being formed in a wrong manner.

In order to achieve the above object of the invention, there is provided an electrostatic recording head, which is constructed so that a number recording electrodes styli are arranged in a row or rows, and are divided into a plurality of sections. Block electrodes are arranged corresponding to these sections. The electrode styli and the block electrodes are combined together for matrix wire coupling and drive. In this recording head, a plurality of sections, each including a plurality of electrode styli, are collected to form a group. The whole array of electrode styli are divided into a plurality of such groups. Wire-bundle connecting terminals are located in positions close to each group on a wiring board, and wire bundles for matrix wiring are connected, for each group, to the connecting terminals on the board.

According to the arrangement described above, the length of the wires, extending from the recording electrodes styli to the connecting terminals, can be shortened considerably, and the wire bundles can be arranged dispersedly. Therefore, the stray capacity and wire-coupling capacity can be reduced sharply. Thus, the load on driver elements can be lessened, so that the power source can be reduced in capacity, and the recording dots can be prevented from being formed wrongly.

Conventionally, a number of high-voltage transistors are used for the drive of the electrostatic recording head. According to the present invention, on the other hand, the reduction of the load on the driver elements permits use of high-integration circuit elements, such as high-voltage CMOS ICs, which can contain a number of high-voltage switching elements in a highly compact arrangement. If push-pull IC elements, combining pnp and npn transistor elements, are used as the driver circuits, the coefficeint of current utilization of the the circuits is improved. Thus, the circuit boards can be reduced in size and cost, and cooling means for the circuit elements can be simplified in structure. Models LZ-1132AD and LZ-1032AD, produced by the Sharp Corporation, Japan, are commercially available examples of the high-voltage ICs. As examples of the push-pull IC circuit elements, moreover, Model TD62C932F, produced by the Toshiba Corporation, Japan, and other models can be applied to the drive of electrostatic recording heads.

DETAILED DESCRIPTION OF THE PREFERRED EMBODIMENTS

Figure 3:
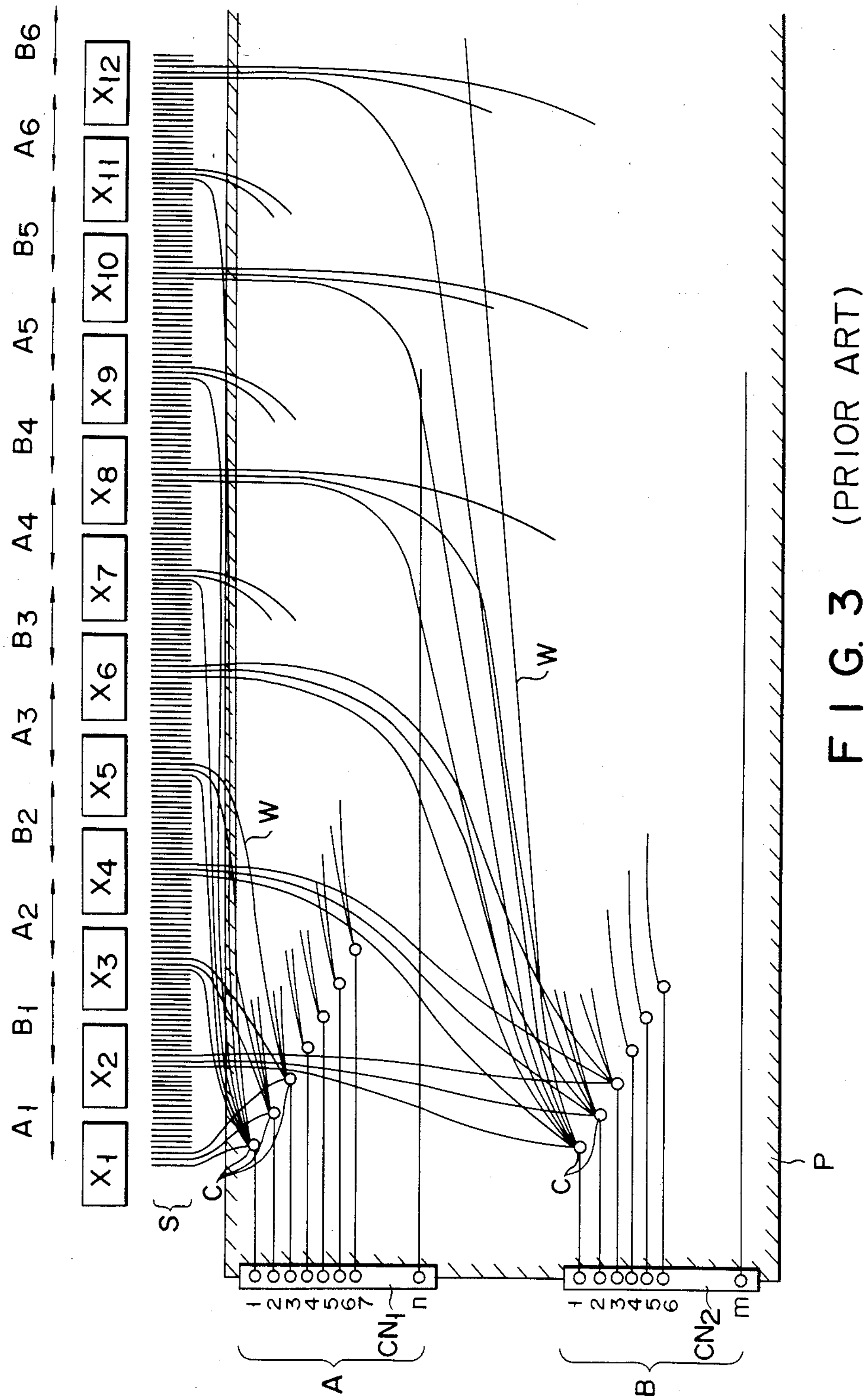
FIG. 3 (PRIOR ART)
FIG. 3 is a schematic view for illustrating a wire arrangement of a prior art electrostatic recording head.
Figure 4:
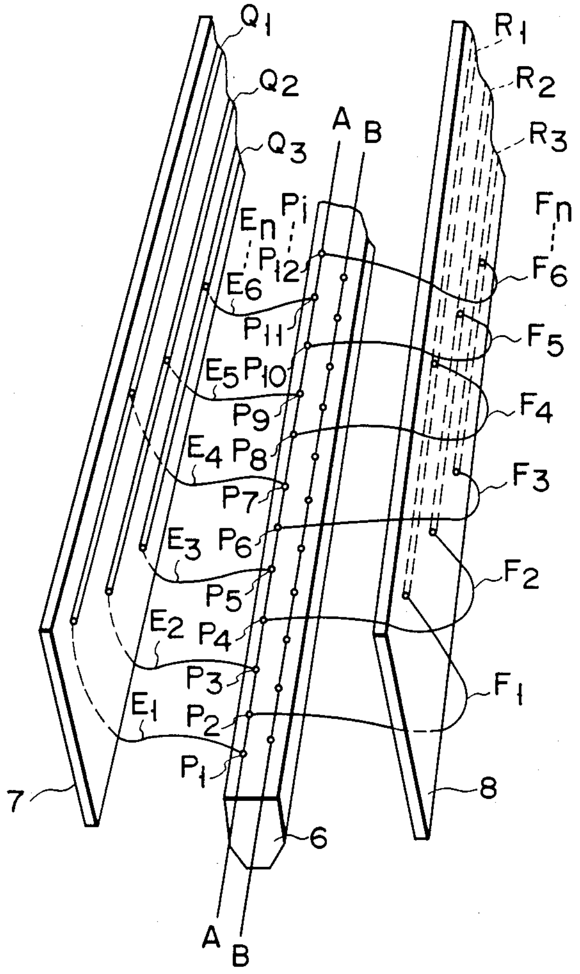
F I G. 4 ( PRIOR ART )
FIG. 4 is a schematic perspective view of another prior art electrostatic recording head.
Figure 5:
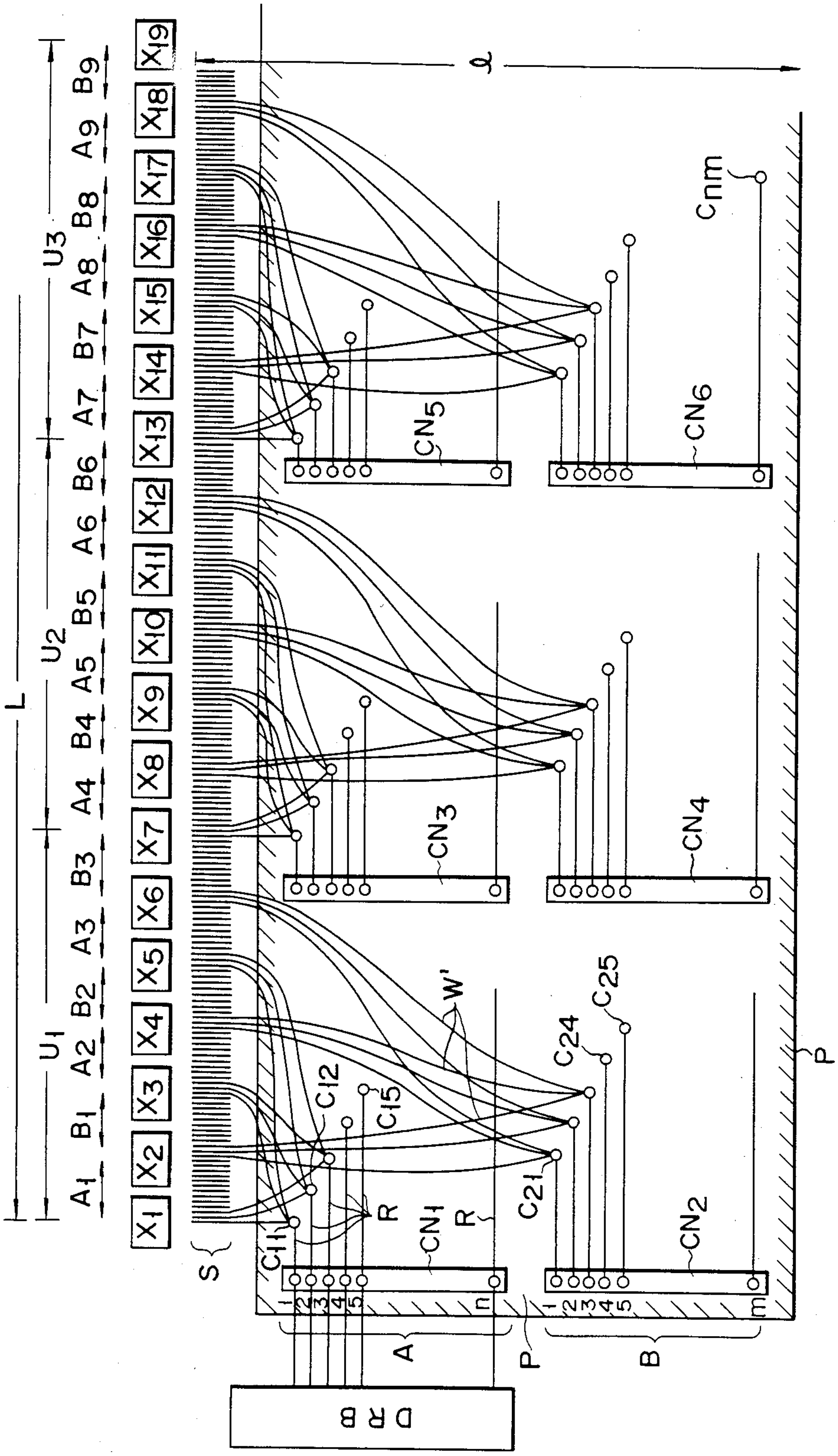
FIGS. 5 to 8 are schematic views for illustrating wire arrangements of electrostatic recording heads according to different embodiments of the present invention.

FIG. 5 is a connection diagram corresponding to FIG. 3 and illustrating an embodiment of the present invention. Referring to FIG. 5, there are shown recording electrode styli S, block electrodes X1, X2, . . ., and element regions A1, A2, . . . and B1, B2, . . ., each including a group of electrode styli and constituting a matrix as a whole. Also shown are wiring board P, groups of driver connecting terminals A and B, conductor lines R of board P, divided conductors or wires W′, dispersed wire-bundle connecting terminals C11, C12, . . . Cnm, and connectors CN1, CN2, . . . mounted on board P. Terminal groups A and B are divided lest recording signal voltages be applied simultaneously to the adjacent matrix regions.

Terminals 1, 2, 3, 4, . . . n of connector CN1 and terminals 1, 2, 3, 4, . . . m of connector CN2 are terminals which are connected with one of driver circuits of driver board DRB. Conductor lines R extend individually from these terminals, and wire-bundle connecting terminals C11, C12, C13, . . . are arranged dispersedly in the conductor lines, in close vicinity to groups mentioned later.

In the present embodiment shown in FIG. 5, as compared with the prior art arrangement shown in FIG. 3, a recording head is divided into a plurality of groups U1, U2, U3, . . . throughout its length. These groups each include a plurality of element regions. For example, first group U1 includs regions A1, B1, A2, B2, A3, and B3. In each of the groups, the element regions are coupled to the wiring boards so that the recording electrode styli driven by one driver circuit are connected to one of wire-bundle connecting terminals C11, C12, C13, . . . by means of one wire bundle W′ whose length defines the shortest possible course. This arrangement resembles an arrangement of an elongate recording head which is formed by compactly connecting head elements U1, U2, U3, . . . with a narrow recording width. In this arrangement, the wiring boards are independently situated close to the narrow-width recording head elements.

The aforesaid division into the groups provides an advantage that the wires for the connection can be reduced in total length. Thus, in the elongate recording head, length 1 of the wiring board in the direction perpendicular to the arrangement direction of the recording electrode styli is much shorter than total length L of the array of styli. This indicates that the arrangement of the present invention is highly effective. The wire length can be reduced further by increasing the number of groups until the wire length becomes substantially equal to the arrangement width of the electrode styli connected to the wire bundles. If the number of groups is further increased, the total wire length cannot be reduced any more.

If the groups are increased in number, the number of the wires driven by each driver circuit can be reduced. Accordingly, the stray capacity and line-connection capacity can be reduced with desirable results, although the number of driver circuits must be increased inevitably. The increase of the driver circuit number can, however, be compensated fully by the use of high-density IC driver circuits. Thus, the driver circuits can be reduced in size and cost.

Although the IC versions of driver circuits can be formed integrally with the wiring boards, the wiring boards of the driver circuits and the recording head should preferably be arranged separately, using connectors, in view of the handling efficiency of the head.

Most desirably, the stray capacity of the wire bundles, driven by the individual driver circuits, should be reduced without increasing the number of the driver circuits for driving the recording electrode styli.

To attain this, according to the present invention, the wire bundles, extending from the individual recording electrode styli, are connected to their corresponding connecting terminals on the wiring boards, and also to the driver circuits through the conductor lines of the wiring boards. Moreover, a plurality of wire-bundle connecting terminals are used to connect the wire bundles belonging to the different groups. These terminals are dispersed in one conductor line on each wiring board which is connected to one of the driver circuits. Thus, wire bundles from a plurality of groups can be driven simultaneously by means of one driver circuit.

Figure 6:
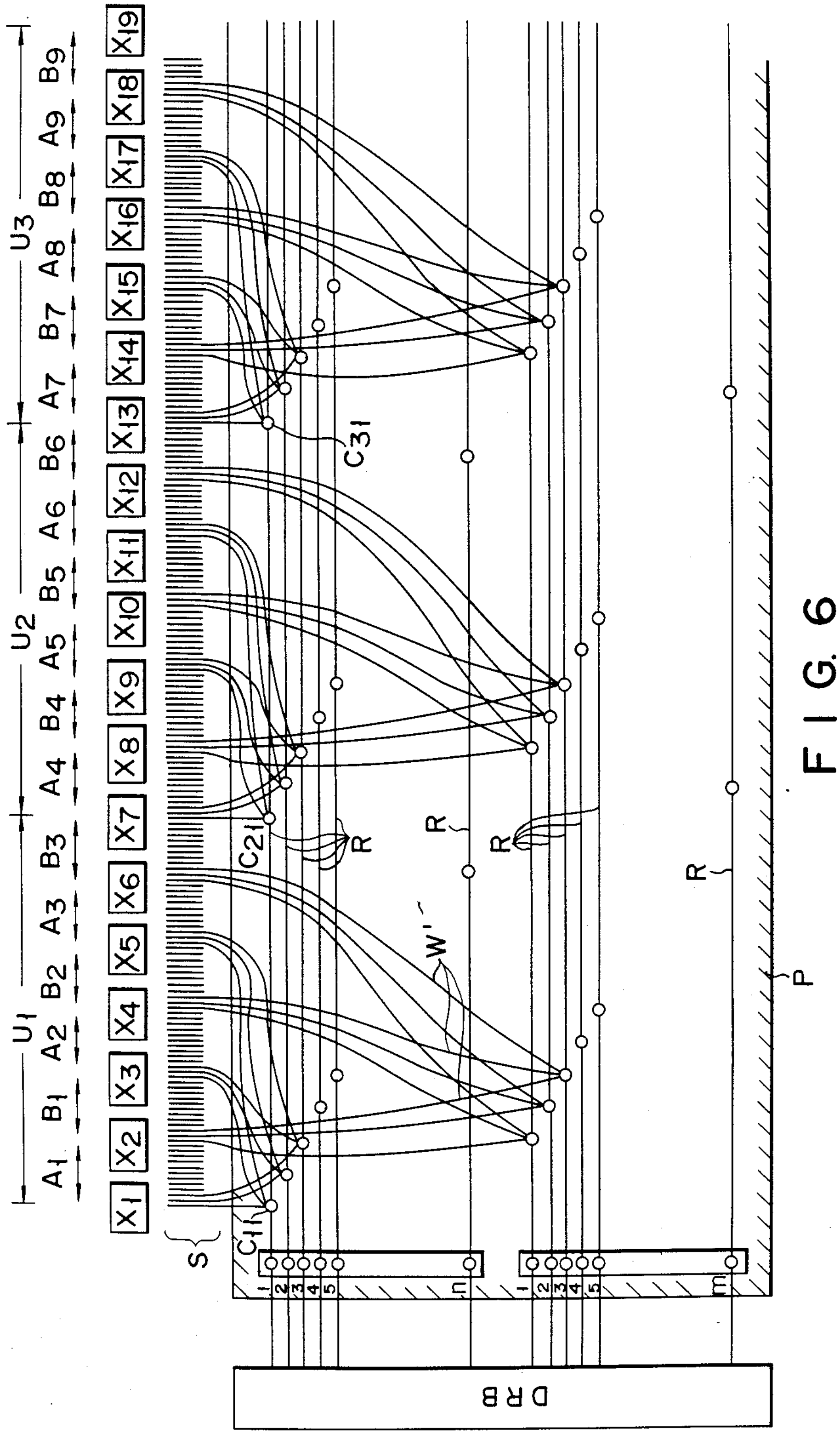

FIG. 6 shows an embodiment arranged in the aforesaid manner. In FIG. 6, symbols U1, U2, U3, . . . designate groups of recording electrode styli; P, a wiring board; and R, wiring-board conductor lines. A plurality of wire-bundle connecting terminals C11, C21, C31, . . . are arranged dispersedly in one conductor line R. The individual connecting terminals correspond to different bundles of wires, and are positioned so as to be connected to the wiring board by means of the bundles of the shortest wires. The conductor lines are connected individually to driver circuits of driver board DRB, and a signal from one driver circuit is applied simultaneously to the wire bundles extending from the different groups of styli. In this arrangement, although the number of electrode styli corresponding to each driver circuit is not smaller, the stray capacity can be smaller because the wires extending from the styli are shorter.

Further, the embodiment of FIG. 6 can provide the following additional effect. The wire bundles used in this embodiment are thinner than those used in the prior art arrangement. Therefore, the average conductor spacing is widened, so that the wire-coupling capacity is reduced. This effect continues to heighten as the number of wire bundles increases. Ultimately, an arrangement is provided such that a junction is located for each wire, on the wiring board, as illustrated schematically in Japanese Patent Publication No. 57-8469. Such an arrangement cannot, however, be obtained without making the wiring board unduly large-sized, in order to house the connecting terminals. As a result, the wire length increases, so that the stray capacity and wirecoupling capacity increase again, thereby spoiling the effect. Moreover, the connection work of the individual wires and terminals increases considerably. Thus, the division of the wire bundles is restricted by these awkward situations.

Figure 7:
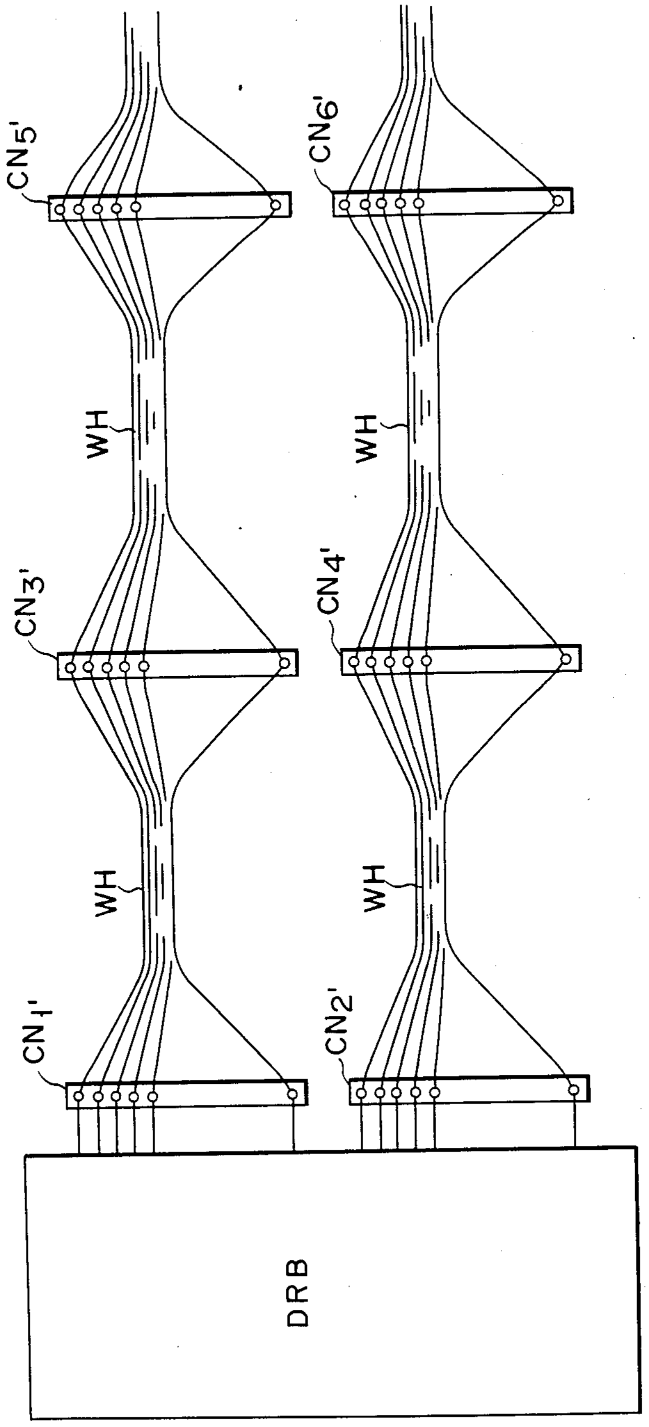
Figure 8:
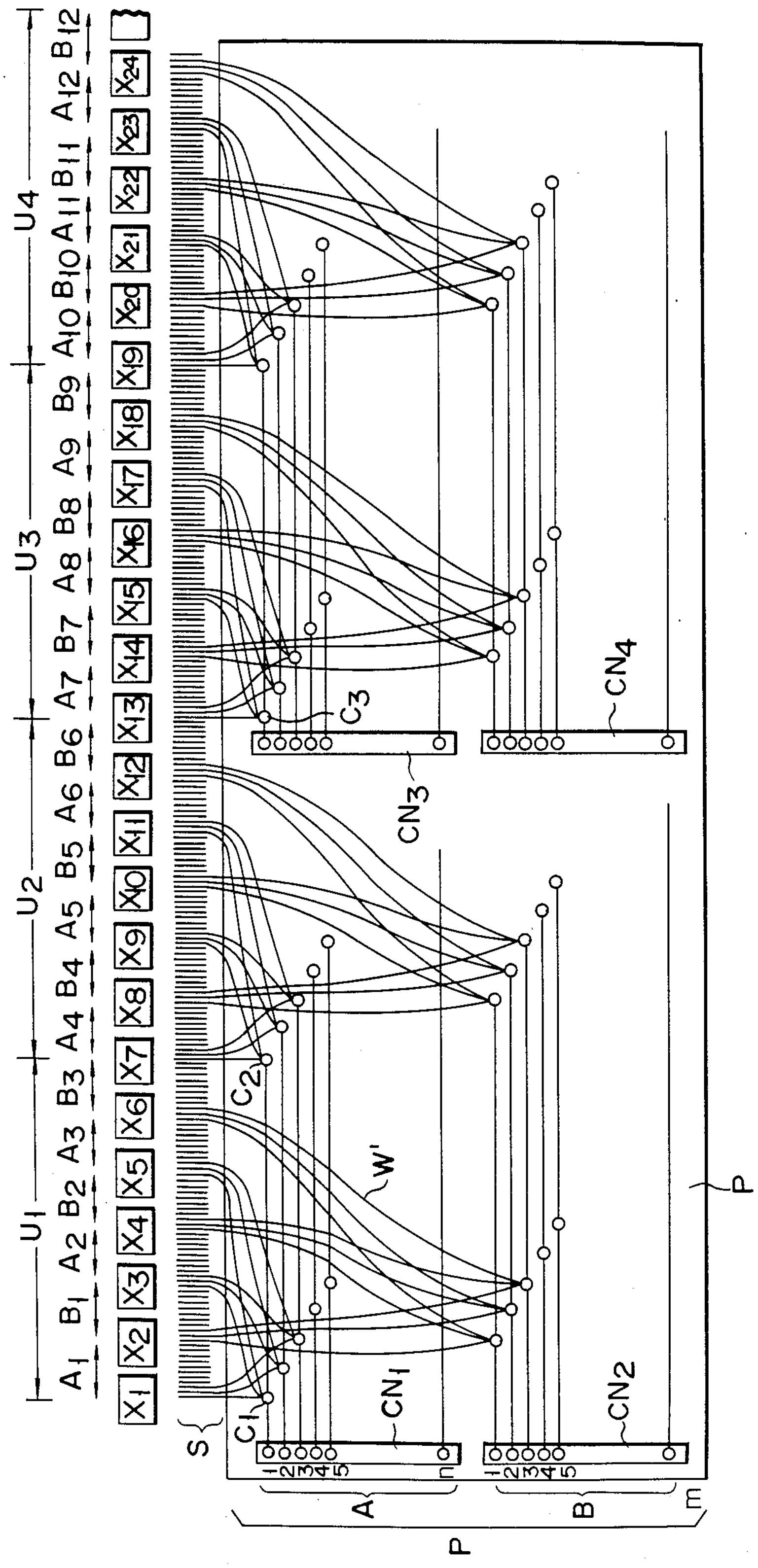

In order to obtain the effect of the present invention, according to embodiments shown in FIGS. 7 and 8, as well as the embodiments shown in FIGS. 5 and 6, several or several tens of groups should preferably be arranged if the recording width of the recording head is 1 m, and if the maximum distance from each electrode stylus to the end of each wire bundle of the wiring board ranges from 10 to 15 cm. The optimum number of groups varies depending on the depth of embedment of the electrode styli of the recording head or the locations of the wiring boards.

In the embodiment shown in FIG. 6, a plurality of wire bundles are connected, by means of one conductor line on the wiring board, to dispersed junctions. If the number of junctions on each conductor line is increased, the wiring board becomes larger in size and more complicated in construction, thereby possibly lowering the effect of the invention.

FIG. 7 shows another embodiment which can provide the same effect of the embodiment of FIG. 6 without entailing the aforementioned problems.

In the arrangement shown in FIG. 7, each of the wire connecting terminals of each group is connected to a connector by means of a conductor line. Wire bundles belonging to different groups are connected electrically to one another, on the driver side of the connector. Thus, a plurality of groups of wire bundles can be driven simultaneously by means of one driver circuit.

In FIG. 7, symbols CN1', CN2', CN3', . . . designate driver-side connectors which correspond to connectors CN1, CN2, CN3, . . ., respectively, on the wiring boards shown in FIG. 5. Corresponding pins of connectors CN1', CN3', CN5', . . . and those of CN2', CN4', CN6', . . . are connected electrically to one another by means of wire harnesses WH, and are connected individually to driver circuits of driver board DRB. Instead of harnesses WH, conductor lines of driver board DRB may be used to connect the pins to one another. The embodiment of FIG. 7 can produce the same effect of the embodiment of FIG. 6.

If the arrangements of FIGS. 5 and 6 are combined together, the wiring boards can be prevented from being complicated in structure, and the wiring on the driver side can be simplified. FIG. 8 shows an embodiment as a result of such combination.

In FIG. 8, a plurality of wire connecting terminals of individual groups, arranged dispersedly on wiring boards, are connected on the boards, thus constituting a set of groups. A recording head is formed by combining a plurality of such group sets.

In FIG. 8, moreover, wire-bundle connecting terminals of groups U1 and U2 and groups U3 and U4 are connected to one another on wiring board P, and are also connected to the respective pins of connectors CN1, CN2, CN3, and CN4. Thus, groups U1 and U2 constitute one group set, and groups U3 and U4 constitute another. The recording head is formed by combining a plurality of such group sets. If the groups are relatively few, it is easy to provide an arrangement such that a plurality of groups of wire connecting terminals are connected on the wiring boards.

The wire boards of the group sets may be driven by either of the following two methods. In one method, the driver circuits are connected individually to connector pins 1, 2, 3, . . . In the other method, the respective pins of connectors CN1 and CN3 and those of connectors CN2 and CN4 are connected to one another on the driverboard side, as in the embodiment shown in FIG. 7, and the wire bundles are driven in common with one another. The selection of the method depends on the capacity of the driver circuits and the stray capacity. In either case, the wiring density cannot be one-sided.

[EXAMPLES]

Figure 1:
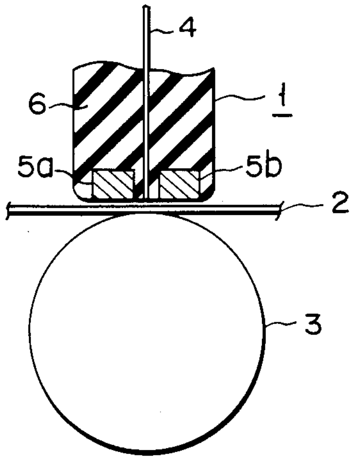
FIG. 1 (PRIOR ART)
FIGS. 1 and 2 are schematic sectional views of electrostatic recording heads for illustrating different electrostatic recording systems.
Figure 2:
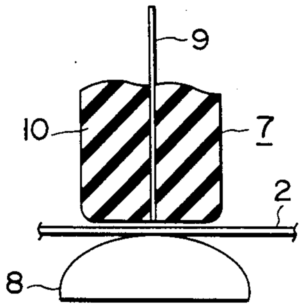
FIG. 2 (PRIOR ART)
Figure 9:
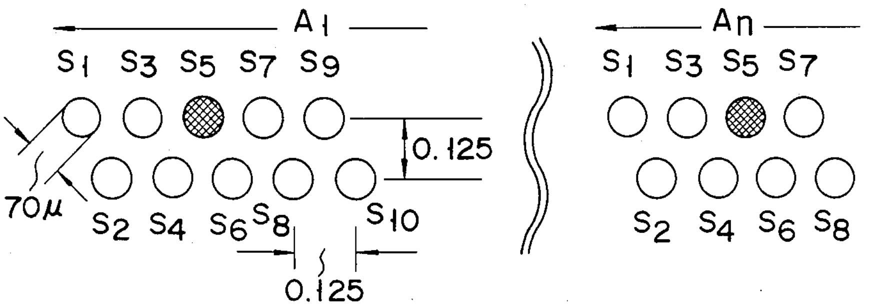
FIG. 9 is a diagram showing arrangements of electrodes for illustrating experimental examples.

Recording electrode styli, formed of nickel wires of 70-micron diameter, were arranged in zigzags at pitches of 125 microns, as shown in FIG. 9. Thus, an electrostatic recording head having an effective recording width of about 900 mm was fabricated. This recording head is adapted for a recording density of 16 dots/mm (≈400 DPI). The arrangement pitch of the groups of wire-bundle connecting terminals on the wiring board was about 10 cm.

EXAMPLE 1

The recording head was divided, throughout its length, into 57 element regions 16-mm wide, by the conventional method shown in FIG. 3. These element regions were classified into groups of regions A and B, which were arranged alternately. Each element region included 256 recording electrode styli. Groups A and B included A1 to A29 and B1 to B28, respectively. Twenty-eight or 29 wire bundles were connected to each of the driver circuits, which were 512 in total number for both A and B.

In this arrangement, the wires extended across the overall width of the recording head, from the junction of each wire bundle.

(MODE A)

In measurement mode A, a capacity measurer terminal was held against recording electrode stylus S5, which was connected to one of the driver circuits, and those terminals connected to surrounding electrode styli S3, S4, S6, and S7 were grounded. With this arrangement, the stray capacity measured 1,100 to 1,400 picofarads (at 100 kHz to 1 MHz; comon to the following cases).

(MODE B)

In mode B, the measurer was connected to a wiring terminal which was connected to electrode stylus S5, and adjacent stylus S6 was grounded. The stray capacity measured 1,000 to 1,400 picofarads.

EXAMPLE 2

A recording head, having the same overall length and the same electrode-stylus arrangement as Example 1, was divided into four sections or groups U1, U2, U3, and U4, throughout its length, as shown in FIG. 8. Wire bundles from two of these groups were connected by means of conductor lines on the wiring board. The width of each element region was 8 mm, so that 128 recording electrode styli were arranged in each element region. Thus, the element regions were substantially twice as many as those of Example 1.

The number of wires in the wire bundles extending from each group was 14 or 15, and 28 or 29 wires were allotted to each driver circuit for each two groups, just as in the case of Example 1.

(MODE A)

In mode A, the stray capacity measured 350 to 400 picofarads.

(MODE B)

In mode B, the stray capacity measured 230 to 290 picofarads.

The reduction of the capacity, in this example, is regarded as attributable mainly to the reduction of the length of the wires, extending from the recording electrode styli to the wire-bundle junctions. The rate of capacity reduction proved substantially proportional to the number of divisions or groups.

EXAMPLE 3

A recording head, having the same overall length and the same electrode-stylus arrangement as Example 1: was divided into eight sections or groups U1 to U8, throughout its length. Each two of the eight groups were combined together to form a group set. Thus, four groups sets U1+U2; U3+U4; U5+U6; and U7+U8 were formed. For each two groups, the wire-bundle junctions were connected by means of conductor lines on the wiring substrate. The width of the element regions was 4 mm, so that 64 recording electrode styli were arranged in each element region.

Just as in Example 1 and 2, the number of element regions included in each group set was 28 or 29, so that the number of recording electrode styli allotted to each driver circuit was also 28 or 29. Thus, 128 driver circuits, which are twice as many as the 64 electrode styli, were required for each group set. In total, therefore, 512 driver circuits were used.

(MODE A)

In mode A, the stray capcity measured 270 to 330 picofarads.

(MODE B)

In mode B, the stray capacity measured 140 to 180 picofarads.

According to the eight-division arrangement of Example 3, compared with the four-division arrangement of Example 2, the capacity was reduced at a lower rate.

According to the present invention, as described above, there may be provided an electrostatic recording head, in which the stray capacity and wire-coupling capacity of recording electrode styli, including wires, are so small that the driver circuits and power supply can be reduced in capacity. In particular, therefore, IC elements can be used as the driver circuits, so that the driver board can be reduced in size and in cost, and the heating means can be simplified in structure. Moreover, the recording dots can be prevented from being formed in a wrong manner. Thus, an elongate recording head can be obtained without entailing difficulties in manufacture, or increase in size of the wiring boards or the space therefor.

What is claimed is:

1. An electrostatic recording head, comprising:

a number of recording electrode styli spaced apart from one another along a row, sets of adjacent electrode styli along the row defining consecutive element regions wherein each of a certain number of consecutive element regions along the row constitutes one of a number of different element groups;

a plurality of block electrodes arranged in corresponding relation to the element regions so that opposite ends of the block electrodes face adjacent element regions;

a wiring board including a plurality of connectors each arranged to receive a driving signal, a plurality of conductor lines extended from each connector and parallel with one another, and a plurality of connecting terminals coupled to the conductor lines; and wires connecting each of the connecting terminals to a predetermined stylus in each ofthe element regions of a corresponding element group, for transmitting driving signals applied to the connectors to the styli.

2. The electrostatic recording head according to claim 1, wherein a certain number of the connectors are associated with each element group, and the styli in each element region of the group are connected through said wires to the connecting terminals of conductor lines extending from a different connector than the connector to which the styli of an adjacent element region of the group are connected.

3. The electrostatic recording head according to claim 2, wherein each of the connectors is associated in common with each element group, and said connecting terminals are coupled to each of the conductor lines at predetermined intervals along the conductor lines of each connector so that the lines are connected through the wires to the corresponding styli of each group.

4. The electrosratic recording head according to claim 1, wherein the number of said connectors is the same as the number of said element groups.

5. The electrostatic recording head according to claim 2, including harness means for connecting corresponding pins of connectors associated with different element groups to one another.

6. The electrostatic recording head according to claim 2, including harness means for connecting corresponding pins of connectors associated with different element groups to one another.

* * * * *